Figure 1:
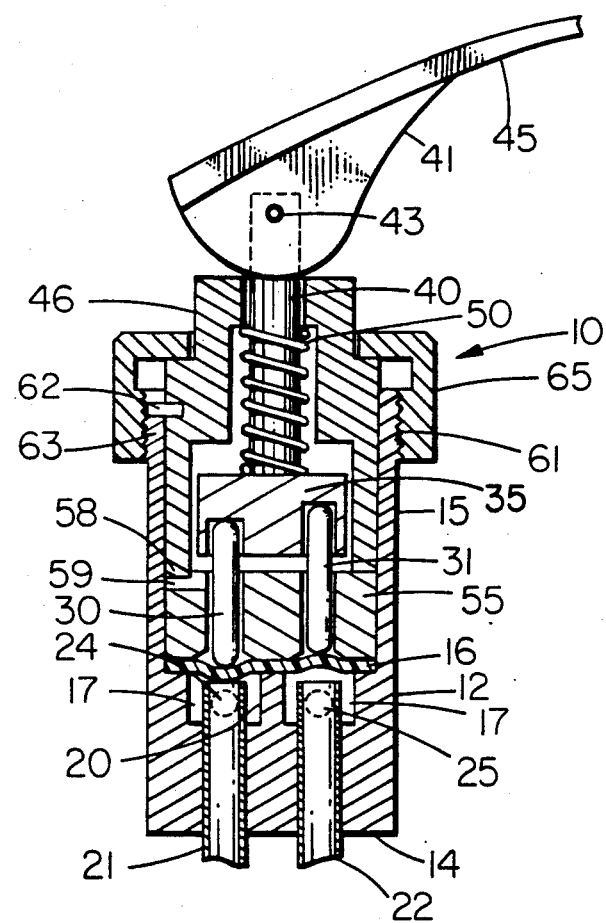

United States Patent [19]

Buchner et al.

[11] Patent Number: 4,662,399
[45] Date of Patent: May 5, 1987

[54] SINGLE LEVER MIXING VALVE

[75] Inventors: Daniel C. Buchner, Chatham; Alan M. Hale, Guelph, both of Canada

[73] Assignee: Waltec Inc., Ontario, Canada

[21] Appl. No.: 817,247

[22] Filed: Jan. 8, 1986

[30] Foreign Application Priority Data

Jan. 8, 1985 [CA] Canada ................................. 471637

[51] Int. Cl.⁴ ............................................. F16K 11/14
[52] U.S. Cl. ............................. 137/625.17; 137/636.4; 137/625.4
[58] Field of Search ................ 137/625.17, 625.4, 636, 137/636.1, 636.3, 636.4

[56] References Cited

U.S. PATENT DOCUMENTS

| | | | |
|---|---|---|---|
| 2,966,928 | 1/1961 | Fairchild | 137/636.3 |
| 3,369,566 | 2/1968 | Schmitt et al. | 137/636.3 X |
| 3,411,540 | 11/1968 | Iannelli | 137/636.4 X |
| 3,421,540 | 1/1969 | Fulton et al. | 137/636.4 X |
| 3,468,344 | 9/1969 | Sanford | 137/636.4 |
| 3,586,053 | 6/1971 | Browning | 137/636.4 |
| 3,603,347 | 9/1971 | Paolini | 137/625.17 |
| 3,693,660 | 9/1972 | Wheelock | 137/625.4 |
| 3,724,498 | 4/1973 | de Villiers | 137/636 X |
| 3,978,890 | 9/1976 | Barnum | 137/636.4 |

FOREIGN PATENT DOCUMENTS

| | | |
|---|---|---|
| 85615 | 4/1924 | Canada . |
| 528308 | 7/1956 | Canada . |
| 634099 | 1/1962 | Canada . |
| 796103 | 10/1968 | Canada . |
| 851499 | 9/1970 | Canada . |
| 885801 | 11/1971 | Canada . |
| 1066258 | 11/1979 | Canada . |

Primary Examiner—Alan Cohan
Assistant Examiner—John A. Rivell
Attorney, Agent, or Firm—Vance Marston; Stewart L. Gitler

[57] ABSTRACT

Disclosed is a proportioning valve which is of simple design compared to prior art arrangements and is easily constructed. The valve comprises lower and upper body members, the lower body member having a chamber region closed off by a flexible diaphragm of elastomeric material or, in an alternative arrangement, two diaphragms. The bottom of the chamber region has first and second inlets and the wall of the chamber has at least one outlet. Two cam followers are secured above the diaphragm, for axial movement only, in alignment with the inlets and they co-operate with a face cam which is movable both axially and rotationally. Rotation of the face cam results in one cam follower moving up, while the other moves down, thus resulting in movement of one portion of the diaphragm towards its associated inlet while the other moves away from its associated inlet, thereby controlling the relative rates of flow of liquid into the chamber region from the inlets. Axial movement of the face cam causes both cam followers to move upwardly or downwardly by the same amount, thus similarly moving the associated portions of the diaphragm and controlling the total rate of flow of liquid into the chamber region. A handle with a second cam is provided whereby rotation of the handle rotates the face cam while pivoting of the handle results in axial movement of the face cam.

2 Claims, 2 Drawing Figures

U.S. Patent

May 5, 1987

4,662,399

SINGLE LEVER MIXING VALVE

This invention relates to a proportioning valve, and in particular to a single-lever faucet which can control both the total and relative rates of flow of hot and cold water.

A single-handle mixing faucet is disclosed in U.S. Pat. No. 3,468,344 of R. C. Sanford, issued Sept. 23, 1969. However, the structure disclosed in that patent is quite complicated and relatively difficult to construct. For example, it uses a cam of eccentrically tapered form and a pair of diaphragms of complicated shape.

A single-handle mixing faucet is also disclosed in FIGS. 8-10 of Canadian Pat. No. 1,042,864 of Gerald J. Farrell, et al., issued Nov. 21, 1978. The faucet of that patent uses diaphragms of complex shape (best shown in FIG. 7 of the patent) which are molded of a soft elastomeric material. A central cupshaped portion of each diaphragm is retained in a tubular end portion of a plunger which provides the requisite structural strength to withstand stresses due to hydraulic and mechanical pressure in the faucet. As mentioned above, the present invention may use a simple flat diaphragm, thus greatly simplifying construction. The faucet according to the Canadian patent can control the proportioning of hot and cold water to, say, a shower head, but "no means is provided for regulating volume of flow to the shower head, and a separate valve to regulate flow rate is typically used and normally set to provide a constant volume of water to the shower head". The faucet or valve according to the present invention can, despite its simplicity, control both mixing and flow rates.

The present invention provides a proportioning valve which, to produce, requires primarily only axial machining, unlike the structure of U.S. Pat. No. 3,468,344 which requires both axial and radial machining. The valve of the invention uses a simple face cam, rather than a cam of eccentrically tapered form. Furthermore, the invention may use a simple flat diaphragm rather than a pair of diaphragms of complicated shape, as in the above-mentioned patents.

Thus, in accordance with a broad aspect of the invention, there is provided a proportioning valve comprising a body structure having a bottom portion, an upstanding peripheral wall portion, and chamber means defined by said bottom portion, said wall portion, and generally flat diaphragm means comprised of elastomeric material secured in spaced relationship with said bottom portion, said valve further comprising first and second inlets extending through said bottom portion into said chamber means, at least one outlet extending through said wall portion into said chamber means, and first and second cam followers secured in said body structure for axial movement only, each cam follower being aligned with one of said inlets and having a lower end contacting said diaphragm means and an upper end contacting a face cam, said face cam being disposed in said body structure for rotational and limited axial movement therein and cooperating with said first and second cam followers, and means for moving said face cam axially and rotationally, said face cam being shaped so that rotational movement thereof causes one cam follower to move part of said diaphragm means towards its associated inlet and causes the other cam follower to allow part of said diaphragm means to move away from its associated inlet to thereby control the relative amounts of liquid per unit time entering said first and second inlets, whereas axial movement of said cam causes both cam followers to move axially so that both said parts of said diaphragm means move towards or away from their associated inlets to thereby control the volume of liquid per unit time entering the chamber means via said inlets.

Figure 2:
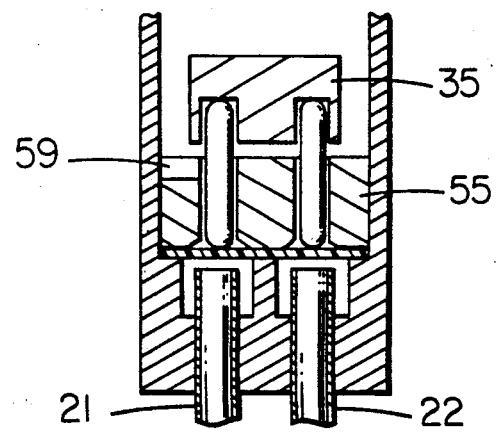

The invention will now be further described in conjunction with the accompanying drawings, in which:

FIG. 1 is a cross-sectional view of a mixing valve according to the invention, showing one position of the face cam, and FIG. 2 is a view similar to FIG. 1, but with some parts omitted, showing the face cam in a different position.

Referring to FIG. 1, the valve according to the invention, shown here embodied in a faucet, is generally indicated at 10. The valve comprises a body structure including a lower body member 12 having a bottom portion 14 and an upstanding peripheral wall portion 15. A generally flat diaphragm 16 is retained in spaced relationship with the bottom portion 14 to thereby define chamber means 17 in the lower body member 12. In the embodiment shown, the chamber means comprises two separate chambers defined by a dividing wall 20, but a single mixing chamber could be made by forming one or more passageways in wall 20 or by omitting wall 20 altogether. First and second inlets 21 and 22 extend through the bottom portion 14 into the chamber means 17. As shown in FIG. 1, outlets 24 and 25 are provided through the upstanding peripheral wall portion 15 although, in the case of a single mixing chamber, only one outlet would be necessary. With an arrangement as shown in FIG. 1 the outlets 24 and 25 may communicate with a further chamber communicating, in turn, with a common discharge spout. However, in some jurisdictions, e.g. Great Britain, it is necessary to keep the hot and cold water separated until they leave the discharge spout, the discharge spout having two separate passageways. In that case outlets 24 and 25 would be connected to such passageways.

Although FIGS. 1 and 2 show a single diaphragm, it will be appreciated that two separate diaphragms could be used, one for each of inlets 21 and 22. Also, although the diaphragm can be generally flat, as shown and described, it could be provided with thickened or protruding portions, e.g. opposite the inlets; it would still be relatively simple and easily made.

First and second axially movable cam followers 30 and 31 are disposed in the lower body member 12, each cam follower being aligned with one of the inlets 21, 22 and having a lower end contacting the diaphragm 16. The cam followers each have an upper end contacting a face cam 35. The face cam is disposed in the lower body member 12 for rotational and limited axial movement therein and co-operates with the first and second cam followers 30 and 31. A shaft 40 is attached to the face cam 35 and a second cam 41 is attached to the upper end of shaft 40 for pivotal movement about an axis 43 through the top of the shaft. Attached to cam 41 is a handle 45. Pivoting of the cam 41 by means of handle 45 causes different portions of the face of cam 41 to contact the upper end of upper body member 46, secured in lower body member 12, resulting in the shaft 40 and attached face cam 35 moving axially up or down. A spring 50 biases the face cam 35 downwardly. Rotational movement of handle 45 causes rotation of shaft 40 and attached face cam 35. Preferably a stop means limits rotation of the face cam 35 to a predetermined range.

This could be accomplished by various means known in the art but one possibility, and probably the easiest, is by incorporating "stops", not shown, in the upper body member 46. It is then necessary to ensure that upper body member 46 and retaining member 55 are aligned with lower body member 12. In FIG. 1, upper body member 46 and retaining member 55 are aligned with lower body member 12 by the following measures. A pin 62 fixed in upper body member 46 engages a slot 63 in lower body member 12, thereby aligning the upper and lower body members. A lug 58 on the bottom surface of upper body member 46 mates with a notch 59 in the upper surface of retaining member 55 to complete the alignment of the elements. A cap 65 attached to lower body portion 12 by threads 61 completes the assembly. It can readily be seen that pivoting of handle 45 results in the two cam followers 30 and 31 moving equal amounts vertically to thereby cause the portions of diaphragm 16 associated with inlets 21 and 22 to also move vertically and hence control the volume of liquid per unit time entering the chamber 17. Rotation of handle 45, because of the shape of face cam 35, results in one cam follower moving a portion of the diaphragm downwardly, while the other cam follower allows a portion of the diaphragm to move upwardly from its associated inlet. By this means, the relative amounts of liquid per unit time entering via the inlets 21 and 22 are regulated.

FIG. 1 shows the cam in a position in which more fluid can enter via inlet 22 than via inlet 21, whereas FIG. 2 shows the cam in a position in which the two cam followers are at the same height so that equal amounts of liquid may enter via the inlets 21 and 22.

The cam followers slide in bores through the retaining member 55 which is secured in the lower body member 12 by upper body member 46 which, in turn, is secured in place by cap 65.

As can be seen by inspection of FIG. 1, the lower body member 12 may easily be formed by axial machining operations, as may the upper body member 46.

The embodiments of the invention in which an exclusive property or privilege is claimed are defined as follows:

1. A proportioning valve comprising:
   (a) a lower body member having a bore extending from an upper end to a first predetermined depth;
   (b) first and second chambers extending from said first predetermined depth to a second predetermined depth, said chambers being covered by a generally flat diaphragm comprised of elastomeric material;
   (c) first and second inlets extending through a bottom portion of said lower body member into said chambers;
   (d) outlets extending through a wall portion of said lower body member into said chambers;
   (e) first and second rod-like cam followers disposed in first and second axially extending holes through a retaining member disposed in said bore above said diaphragm, said retaining member securing said diaphragm against a shoulder at the bottom of said bore;
   (f) an upper body member being disposed in said bore and having a lower end engaging said retaining member; and
   (g) fastening means being provided to secure said upper body member in said lower body member, said upper body member having an axial through bore including:
      (i) a first lower region in which is disposed a face cam, said face cam having a shaft extending upwardly through a second and a third region of consecutively smaller diameter than said first region;
      (ii) a spring being disposed in said second region to urge said face cam downwardly into engagement with said cam followers; and
      (iii) handle means attached to said shaft for moving it, together with said cam, either axially or rotationally, said face cam being shaped so that rotational movement thereof causes one cam follower to move part of said diaphragm towards its associated inlet and causes the other cam follower to allow part of said diaphragm to move away from its associated inlet to thereby control the relative amounts of liquid per unit time entering said first and second inlets, whereas axial movement of said cam causes both cam followers to move axially so that both said parts of said diaphragm move towards or away from their associated inlets to thereby control the volume of liquid per unit time entering the chambers via said inlets.

2. A valve as claimed in claim 1 wherein said handle means includes a second cam pivotally movable about a horizontal axis through said shaft, said second cam cooperating with the top wall portion of said upper body member whereby pivotal movement of said second cam causes axial movement of said shaft and attached face cam, while rotational movement of said second cam about a vertical axis causes rotational movement of said shaft and attached face cam.

* * * * *